United States Patent Office 2,976,322
Patented Mar. 21, 1961

2,976,322

PREPARATION OF METHANETHIOL

Hillis O. Folkins, Crystal Lake, Elmer Miller, Cary, and Adolph Kempf, Crystal Lake, Ill., assignors to The Pure Oil Company, Chicago, Ill., a corporation of Ohio No Drawing. Filed Sept. 23, 1953, Ser. No. 381,984

3 Claims. (Cl. 260—609)

This invention relates to the production of methanethiol and is specifically directed to a method and a composite catalyst for increasing the efficiency of the reaction between methanol and hydrogen sulfide to produce said methanethiol.

Mercaptans as a class of compounds may be produced from a variety of raw materials and by means of a plurality of processes. The more adaptable of these processes involves the addition of the sulfhydryl radical to a suitable nucleus. From a standpoint of commercial scale process economics, by far the most attractive synthesis method for the formation of relatively high molecular weight thiols involves the direct addition of hydrogen sulfide to olefinic hydrocarbons in the presence of suitable catalysts. However, the mechanism of the reaction precludes its use in the preparation of methanethiol.

Although it is one of the most classic methods, having been discovered by Sabatier, and entails as simple a mechanism as the reaction between hydrogen sulfide and olefinic hydrocarbons, the dehydration of alcohols by inter-reacting hydrogen sulfide therewith in the presence of a metallic oxide has never been commercially adapted to the production of thiols because of the indifferent results obtained when the process was practiced according to the prior art techniques. It has been found, however, that this reaction may be carried out efficiently and economically in the commercial production of methanethiol by suitably modifying the techniques described in the prior art.

Earlier development work in the production of methanethiol employing methanol and hydrogen sulfide as reactants was concerned primarily with manipulative techniques for improving the efficiency of the reaction. For example, it was found that by carrying out the reaction in the presence of small amounts of water, the efficiency of the reaction was considerably enhanced. This discovery is disclosed and claimed in patent application Serial Number 342,710, filed March 16, 1953. In addition, the use of critical amounts of hydrogen was also found to have a beneficial effect on the conversion. This improvement is disclosed and claimed in United States Patent 2,647,151. The catalysts employed in this work were the metallic oxides disclosed in the prior art. Earlier investigations of this reaction, such as that reported by Kramer and Reid, J.A.C.S., 43 (880), (1921), indicated that thoria was the most effective catalyst for carrying out the reaction. Subsequent work confirmed this and produced results which evidenced that thoria was about twice as effective as zirconia, the next best metallic oxide for carrying out the reaction employing the lower molecular weight alcohols. It has now been found that other compositions may be employed as catalysts for increasing the efficiency of the reaction between methanol and hydrogen sulfide to produce methanethiol.

Accordingly it is an object of this invention to provide a contact or solid catalyst capable of producing high yields of methanethiol from the reaction between methanol and hydrogen sulfide. A further object of this invention is to provide a catalyst which will have a directing effect on selectively catalyzing the reaction between methanol and hydrogen sulfide to produce increased amounts of methanethiol by minimizing the formation of the by-products of reaction, such as 2-thiapropane.

According to this invention it has been found that methanethiol may be produced from the reaction of methanol and hydrogen sulfide in higher yields and with increased selectivity of conversion than has been possible heretofore, by the use of improved composite catalysts consisting essentially of activated aluminum oxides promoted by small amounts of at least one oxide of a metal in group IVB of the periodic table, viz., lead, tin and germanium. To illustrate the instant invention, a number of catalysts were employed as contact catalysts in the reaction between methanol and hydrogen sulfide. A reaction mixture of hydrogen sulfide and methanol in a mol ratio of 2 to 1 and containing about 0.33 mol percent of water was contacted with each catalyst at a temperature of about 750° F. and at 1 atmosphere pressure in a suitable reactor. Each run was conducted using a liquid hourly volume space velocity, based on methanol, of 0.38. This liquid hourly volume space velocity is defined as the liquid volume of methanol feed used per hour per unit volume of catalyst in the reactor. The various results obtained for each catalyst are summarized in Table I.

TABLE I

*Methyl mercaptan synthesis*

| Run | Catalyst Composition | Conversion | Selectivity (Percent) | Yield (Mol Percent) |
|---|---|---|---|---|
| 1 | $Al_2O_3$(F-1)—$SnO_2$ (7 wt. percent). | 84.6 | 87.0 | 73.6 |
| 2 | $Al_2O_3$(F-10)—$SnO_2$ (2 wt. percent). | 75.4 | 74.7 | 56.4 |
| 3 | $Al_2O_3$(F-10) | 67.5 | 68.9 | 46.1 |
| 4 | $Al_2O_3$(F-1) | 71.5 | 75.5 | 54.0 |
| 5 | $Al_2O_3$(F-10)—PbO (2 wt. percent). | 74.6 | 71.0 | 53.0 |

It is seen from Table I that the larger yields of methanethiol are obtained when the promoted catalysts of this invention are employed, as compared with activated alumina. Similarly the properties of the catalysts of this invention for selectively catalyzing the reaction to produce methanethiol are illustrated by the selectivity data. This selectivity feature of the catalyst is defined as the percent of reacted methanol which was converted into methanethiol.

The catalyst of this invention may be prepared by any of the techniques which are conventionally employed in catalyst manufacture. A uniform distribution of the oxide of the metal in group IVB of the periodic table employed as a promoter throughout the alumina may be effected by permeating or impregnating alumina with a suitable salt solution, the coprecipitation method which involves the precipitation of a mixture of alumina and the metallic oxide being employed or by mechanically admixing the components of the composite catalyst which have been prepared by separate precipitation. The amount of the oxide of a metal in group IVB of the periodic table employed as a promoter which may be added to the alumina to enhance its catalytic properties may be between about 0.5% by weight to 15% by weight and preferably between about 0.5% by weight to 8% by weight, although in some instances amounts outside these ranges may be desirable.

The activated aluminas which may be employed in a major proportion in the composite catalyst are those types of sorptive aluminum oxides which in general have surface areas in excess of around 10 square meters per gram. Activated alumina resulting from either naturally occurring materials such as bauxites or those prepared synthetically may be used. A common variety is prepared by controlled calcination of a rock-like form of alpha alumina trihydrate. This type is exemplified by Alcoa Activated Alumina Grade F. A second variety, Alcoa Activated Alumina Grade H, is composed of translucent granules prepared from a gelatinous alumina which has a high surface area even before any decomposition of the alumina hydrate is effected. A third type of sorptive alumina comprises discrete particles of such small size that they have appreciable area on their outer geometric surface. Examples of this type are Alcoa Activated Alumina R–2396 and Alcoa Activated Alumina XF–21. Activated aluminas resulting from other well known methods of preparation may be employed also. The size and shape of the catalyst will be determined by how the catalyst is to be employed. Desired physical forms may be obtained by adding the promoter to a granular, pelleted or fluid type activated alumina, or by processing the finished catalyst to obtain the required shape and size. The subject invention may be carried out in a static or moving bed type of reactor employing granular or pelleted catalysts. However, a fluidized system may also be used and in this instance a finely comminuted catalyst must be used.

In the use of the catalyst of the present invention for the production of methanethiol, the reaction between hydrogen sulfide and methanol may be carried out, as pointed out above, in either a fixed bed process or in a process in which the catalyst moves through the reaction zone. In employing the fixed bed type of reaction, temperatures from about 575° to about 930° F. may be employed. Pressures may vary widely. Superatmospheric pressures from about 50 to 200 pounds per square inch gauge are preferably used. However, the reaction may also be carried out at subatmospheric or atmospheric pressure. The mol ratio of the reactants may range from about 1 to about 5 mols of hydrogen sulfide to 1 mol of methanol. Although it is generally preferred to maintain an excess of hydrogen sulfide in the reactant mixture, it may be desirable to employ substantially stoichiometric proportions in order to avoid unnecessary complications that may occur, for example, in the recovery system. Throughput rates will vary with the temperatures and will in general be from about 0.1 to about 5 volumes if methanol per volume of catalyst per hour. This variable is also known as the above defined liquid hourly volume space velocity.

The recovery of the methanethiol from the reaction effluent may be effected by various alternatives which may be adapted to local conditions or changing economics. One method of separation involves fractional condensation and stabilization or the physical principles of adsorption may be employed to recover the methanethiol from the reaction effluent. Several variations in recovery techniques are described in copending patent application Serial Number 260,353, filed December 7, 1951, which relates to a continuous method for the production and recovery of methanethiol produced in a manner similar to the instant invention.

The catalysts which are described by this invention, in addition to producing increased yields of methanethiol by means of enhanced conversion and selectivity, also have other important characteristics. These catalysts are more economical to produce, are less susceptible to attrition, have a more prolonged life, and are not as readily deactivated by increased operating temperatures as the preferred thoria catalyst described in the prior art. These properties permit the catalyst to be readily employed in a fluidized operation for the production of methanethiol from the reaction of methanol and hydrogen sulfide.

It is to be understood that the foregoing examples of this invention are only illustrative. Other modifications of the manipulative technique employed in carrying out this invention will be apparent to those who are skilled in the art and are accordingly within the scope of the invention as defined in the appended claims.

We claim:

1. In the method for producing methanethiol by the reaction between hydrogen sulfied and methanol at a temperature sufficient to effect the reaction, the improvement which comprises conducting said reaction at a temperature of 575° to 930° F., using a mol ratio of hydrogen sulfide to methanol of about 1:1 to 5:1, and a liquid volume hourly space velocity, based on methanol, of about 0.1 to 5 in the presence of an activated alumina in combination with about 0.5–15% by weight of tin oxide.

2. A method for producing methanethiol by reacting hydrogen sulfide and methanol in a ratio of from about 1 to 5 mols of hydrogen sulfide per mol of methanol at a temperature of from about 575° to 930° F. in the presence of an activated alumina catalyst having a surface area in excess of about 10 square centimeters per gram, promoted with about 2 to 8% by weight of tin oxide and employing a liquid hourly volume space velocity, based on methanol, of from about 0.1 to 5.

3. A method for producing methanethiol by contacting a reaction mixture consisting essentially of hydrogen sulfide and methanol in the mol ratio of 2 mols of hydrogen sulfide per mol of methanol, containing about 0.33 mol percent of water, in a reaction zone at a temperature of about 750° F., and atmospheric pressure, and employing a liquid volume hourly space velocity based on methanol, of about 0.38 in the presence of an activated alumina catalyst having a surface area in excess of about 10 square centimeters per gram and promoted with about 7% by weight of tin oxide.

References Cited in the file of this patent

UNITED STATES PATENTS

| | | |
|---|---|---|
| 2,116,182 | Baur | May 3, 1938 |
| 2,331,292 | Archibald et al. | Oct. 12, 1943 |
| 2,454,227 | Smith et al. | Nov. 16, 1948 |
| 2,667,515 | Beach et al. | Jan. 26, 1954 |